W. B. PEOPLES.
NUT LOCK.
APPLICATION FILED NOV. 11, 1913.

1,192,107.  Patented July 25, 1916.

Inventor
William B. Peoples

Witnesses
Harold Scantlebury
Edna Broyles

By Herbert E. Smith
Attorney

UNITED STATES PATENT OFFICE.

WILLIAM B. PEOPLES, OF ELBERTON, WASHINGTON, ASSIGNOR OF ONE-FOURTH TO AUGUSTUS R. METZ AND ONE-FOURTH TO HUGH R. PENN, BOTH OF ELBERTON, WASHINGTON.

NUT-LOCK.

1,192,107.      Specification of Letters Patent.      Patented July 25, 1916.

Application filed November 11, 1913. Serial No. 800,321.

*To all whom it may concern:*

Be it known that I, WILLIAM B. PEOPLES, a citizen of the United States, residing at Elberton, in the State of Washington, have invented new and useful Improvements in Nut-Locks, of which the following is a specification.

This invention relates to improvements in nut locks and has to do more particularly with an improved form of locking plate or washer and the manner in which the same is locked against rotation both with respect to the nut and the bolt.

It is one of the objects of this invention to so form a portion of the margin of the bolt hole in a manner to cause the same to jam against the threads of the bolt under pressure from the nut, the resulting mutilation being preferably borne by the stock of the locking plate so as not to disrupt the threads of the bolt.

Other features of novelty will be more fully described in connection with the accompanying drawing and will be more particularly pointed out in and by the appended claim.

Figure 1:
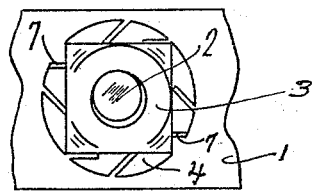
Figure 2:
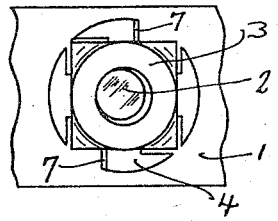
Figure 3:
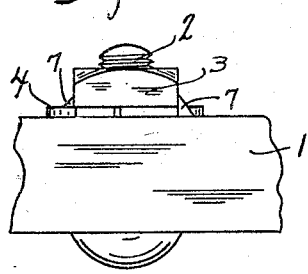
Figure 4:
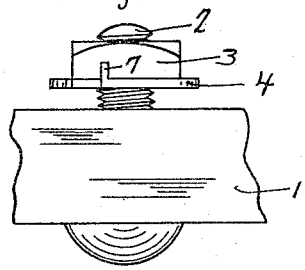
Figure 5:
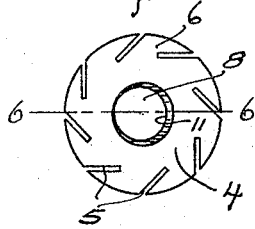
Figure 6:
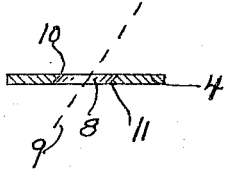
Figure 7:
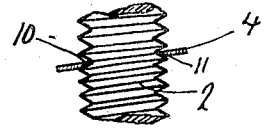
Figure 8:
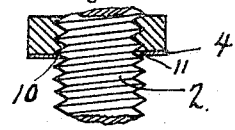

In the drawing: Figure 1 is a face view illustrative of one form of my invention showing one manner of locking the washer to the nut. Fig. 2 is a similar view of a modified form. Fig. 3 is a side elevation showing the nut and washer turned home against the backing. Fig. 4 is a view similar to Fig. 3 showing the nut and washer free from engagement with the backing. Fig. 5 is a face view of my improved locking plate or washer shown detached from the bolt. Fig. 6 is a sectional view on line 6—6 of Fig. 5. Fig. 7 is a view of a portion of the threaded end of the bolt showing the initial position of the locking plate or washer thereon. Fig. 8 is a similar view illustrating the washer in a final locking position with respect to the bolt.

Like characters of reference designate similar parts throughout the different figures of the drawing.

As illustrated, 1 designates a backing through which a bolt 2 is projected with the threaded end thereof on one side and the head thereof on the other side. A nut 3, of usual form, is shown turned onto the bolt against a locking plate or washer which is designated as a whole at 4.

By reference to Fig. 5 it will be seen that the washer is slitted marginally, as indicated at 5, the slits being disposed in such angular relation to the radial as to provide intermediate sections 6 which are adapted to be bent up into engagement with side faces of the nut. The disposition of the slits is such that the sections may be bent up in a manner to engage the side faces of the nut with their edges, as indicated at 7, in Figs. 1 and 2. I provide a sufficient number of slits so as to form or afford such a plurality of sections as to permit of at least two or more sections being bent up in locking relation against the faces of the nut practically irrespective of the final position into which the nut is adjusted. The edgewise engagement disposes the strain in line with the plane of the bent up section so that I obtain the strongest possible locking action.

A continuously smooth circular unthreaded hole 8 is formed in the washer in such a manner as to dispose its axis other than at a right angle to the plane of the washer, as indicated by the dotted line 9 in Fig. 6. Thus the margin of the bore of said hole 8 will be provided with sharp thread jamming portions, as indicated at 10 and 11. It will be seen that no marginal portion projects into the bore and I form the hole with a sufficient diameter to permit of relatively free projection of the threaded end of the bolt therethrough upon movement of the bolt or washer. However, by reason of the angular disposition of the hole 8, the washer will be disposed at an angle other than at a right angle to the axis of the bolt when disposed or placed thereabout, as clearly indicated in Fig. 7. It will now be evident that upon pressure by the nut against the locking plate, when interposed between the nut and backing, movement of the locking plate or washer into a plane at right angles to the axis of the bolt will serve to jam marginal portions of the bore of the washer against the threads. This will serve to lock the washer against independent rotation with respect to the bolt, and in the most preferred embodiment of my invention I prefer to make the locking plate of softer metal than that of which the bolt was composed so that the mutilation resulting from such jamming action will be borne by the washer thereby avoiding disruption of the threads. I do not however, make the washer of lead or like materials, but preferably of a soft iron, which will mutilate more easily than the threads of a bolt.

It will be seen from the foregoing that my improved nut lock does not require any alteration in form of either the bolt or the nut in connection with which it is used, and that the same will serve to effectively lock a nut irrespective of whether the backing is metal or wood as reliance is not placed upon any coaction between the device of my invention and the backing.

While in some cases it will be advantageous to avoid mutilation or disruption of the threads, I may in some cases desire to form the washer of such metal that its pressure into a final position will result in at least a sectional peripheral thread disruption, and I therefore consider that either of the above forms is within the purview of my invention.

While I have herein shown and described one specific form of my invention I do not wish to be limited thereto except for such limitations as the claim may import.

I claim:—

In a nut lock, a bolt having a threaded shank, a locking plate and a nut including means for holding one against independent rotation with respect to the other and said plate having a smooth cylindrical hole equal in diameter to the maximum diameter of the threaded portion of the bolt to pass over the threads thereof with a working clearance, said hole being formed with its axis oblique to the plane of the plate thereby disposing the latter at an oblique angle to the axis of the bolt, the material of the plate being softer than the material of which the bolt is composed whereby shifting movement of the plate under pressure from the nut will jam and mutilate marginal portions of the hole against the threads to fix the plate against rotation with respect to the bolt, substantially as and for the purposes set forth.

In testimony that I claim the foregoing as my own I hereby affix my signature in the presence of two subscribing witnesses.

WILLIAM B. PEOPLES.

Witnesses:
A. R. METZ.
BERTHA B. METZ.

Copies of this patent may be obtained for five cents each, by addressing the "Commissioner of Patents, Washington, D. C."